(12) United States Patent  (10) Patent No.: US 8,472,408 B2
Park et al.  (45) Date of Patent: Jun. 25, 2013

(54) METHOD FOR HANDOVER WITH CONSIDERATION OF LOAD STATUS OF CELLS

(75) Inventors: Gi Won Park, Anyang-si (KR); Jin Lee, Seoul (KR); Yong Ho Kim, Incheon-si (KR); Ki Seon Ryu, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 291 days.

(21) Appl. No.: 12/989,343

(22) PCT Filed: Apr. 17, 2009

(86) PCT No.: PCT/KR2009/002002
§ 371 (c)(1),
(2), (4) Date: Oct. 22, 2010

(87) PCT Pub. No.: WO2009/131337
PCT Pub. Date: Oct. 29, 2009

(65) Prior Publication Data
US 2011/0032909 A1 Feb. 10, 2011

(30) Foreign Application Priority Data
Apr. 24, 2008 (KR) ........................ 10-2008-0038140

(51) Int. Cl.
*H04W 4/00* (2009.01)
(52) U.S. Cl.
USPC .......................................................... 370/332
(58) Field of Classification Search
USPC .............. 370/331, 332, 310.2, 338, 252, 310, 370/313, 315, 328, 333; 455/432.1, 436, 455/437, 440, 442, 444
See application file for complete search history.

(56) References Cited

U.S. PATENT DOCUMENTS

| 6,490,452 B1 * | 12/2002 | Boscovic et al. ............. 455/436 |
| 6,522,881 B1 * | 2/2003 | Feder et al. .................... 455/437 |
| 7,340,255 B2 * | 3/2008 | Heino et al. ................... 455/446 |
| 7,653,393 B2 * | 1/2010 | Kim et al. ...................... 455/437 |
| 2005/0138178 A1 * | 6/2005 | Astarabadi .................... 709/227 |
| 2006/0229075 A1 * | 10/2006 | Kim et al. ..................... 455/436 |
| 2007/0104177 A1 * | 5/2007 | Hwang et al. ................. 370/348 |
| 2007/0111731 A1 * | 5/2007 | Zaki .............................. 455/436 |

FOREIGN PATENT DOCUMENTS

| EP | 1758423 | 2/2007 |
| KR | 10-0658860 | 12/2006 |
| KR | 10-0663529 | 12/2006 |

* cited by examiner

*Primary Examiner* — Anh Ngoc Nguyen
(74) *Attorney, Agent, or Firm* — Lee, Hong, Degerman, Kang & Waimey

(57) ABSTRACT

A method for a handover with consideration of load status of cells is disclosed. The method for intra handover with consideration of load status of cells by a mobile station in a wireless communication system includes receiving a neighbor advertisement (MOB-NBR-ADV) message including load status information of neighbor cells from a serving base station, and performing intra handover according to the load status information of neighbor cells if there is at least a neighbor cell of which channel quality is equal to or higher than a handover threshold for a time duration among neighbor cells in an intra network.

5 Claims, 7 Drawing Sheets

METHOD FOR HANDOVER WITH CONSIDERATION OF LOAD STATUS OF CELLS

This application is the National Stage filing under 35 U.S.C. 371 of International Application No. PCT/KR2009/002002, filed on Apr. 17, 2009, which claims the benefit of earlier filing date and right of priority to Korean Application No. 10-2008-0038140, filed on Apr. 24, 2008, the contents of which are incorporated by reference herein in their entirety.

TECHNICAL FIELD

The present invention relates to a method for handover, and more particularly, to a method for a handover with consideration of load status of cells.

BACKGROUND ART

A mobile station and a serving base station decide whether the mobile station performs handover or not based on channel quality of the serving base station in an IEEE (Institute of Electrical and Electronics Engineers) 802.16e network. That is, the mobile station scans neighbor cells if the channel quality of the serving base station falls below a scanning threshold for a time duration, and performs handover to a neighbor cell if channel quality of at least a neighbor cell is higher than a handover threshold for a time duration. In conclusion, performing handover or the mobile station is decided based on channel quality of serving base stations in the IEEE 802.16e network.

FIG. 1 illustrates an exemplarily of network entry process of a mobile station in an IEEE 802.16e network.

The mobile station receives downlink map (DL-MAP), downlink channel descriptor (DCD), uplink map (UL-MAP) and uplink channel descriptor (UCD) messages and acquires uplink and downlink parameters (110).

Next, the mobile station performs initial ranging and adjusts a timing offset and a power-related parameter value (111).

And, the mobile station negotiates basic capabilities with a base station (112). At step 112, the mobile station transmits the mobile station's capabilities to the base station and receives a response.

The mobile station exchanges secure keys during authorization process (113), and performs registration process with the base station (114). And the mobile station performs authentication process with a AAA (Authentication, Authorization, Accounting) server (120).

Finally, the base station transmits a Dynamic Service Addition Request (DSA-REQ) message to the mobile station to set a service flow, and the mobile station transmits a Dynamic Service Addition Response (DSA-RSP) message to the base station (122).

In an IEEE 802.16e system, a base station informs a mobile station of resource which the base station can assign to the mobile station as a percentage form using a Available DL Radio Resources parameter of a DCD message, and load balancing between the base station and the mobile station is carried out with it. Whenever the Available DL Radio Resources parameter changes, a DCD count value of DL-MAP is increased. The mobile station checks the DCD count value of DL-MAP, and if the DCD count value is different from a prior DCD count value, it judges that a DCD message was updated and reads the DCD message.

But, there is a problem that the mobile station must read the DCD message frequently to check the Available DL Radio Resources parameter because the Available DL Radio Resources parameter changes very often.

DISCLOSURE OF INVENTION

Technical Problem

An object of the present invention is to provide a handover method for excluding a problem that a mobile station must read a DCD message frequently, performing load balancing between the mobile station and base station, and providing the mobile station with a high quality service.

Technical Solution

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for intra handover with consideration of load status of cells by a mobile station in a wireless communication system comprises: receiving a neighbor advertisement (MOB-NBR-ADV) message including load status information of neighbor cells from a serving base station, and performing intra handover according to the load status information of neighbor cells if there is at least a neighbor cell of which channel quality is equal to or higher than a handover threshold for a time duration among neighbor cells in an intra network.

The performing intra handover comprises scanning neighbor cells in an intra network if channel quality of the serving cell is less than a scanning threshold.

The load status information of neighbor cells is a combination of load status information generated by a serving access service network gateway (Serving ASN-GW) and load status information generated by neighbor Serving ASN-GWs.

The load status information of neighbor cells is updated according to a path registration response (Path_Registration_Response) message or a path deregistration request (Path_Dereg_Req) message, which are transmitted from the serving base station to a serving access service network gateway (Serving ASN-GW).

The performing intra handover comprises performing handover to a cell whose load status is not heavy.

In other aspect of the present invention, a method for intra handover with consideration of load status of cells by a mobile station in a wireless communication system comprises: receiving load status information of a cell of a serving base station through a down link channel descriptor (DCD) message from the serving base station; performing network entry to the serving base station if load status of the serving base station is not heavy; receiving load status information of neighbor cells through a neighbor advertisement (MOB-NBR-ADV) message from a serving base station; and performing intra handover according to the load status information of neighbor cells if there is at least a neighbor cell of which channel quality is equal to or higher than a handover threshold for a time duration among neighbor cells in an intra network.

In other aspect of the present invention, a method for inter handover with consideration of load status of cells by a mobile station in a wireless communication system comprises: receiving load status information of a cell of a serving base station through a down link channel descriptor (DCD) message, and receiving load status information of neighbor cells through a neighbor advertisement (MOB-NBR-ADV) message from the serving base station; scanning neighbor cells in an inter network if the serving base station's channel quality is less than a scanning threshold and load status of all intra cells is heavy; and performing inter handover according to load status of the neighbor cells in an inter network and a result of the scanning.

The load status information of neighbor cells is a combination of load status information generated by a serving access service network gateway (Serving ASN-GW) and load status information generated by neighbor Serving ASN-GWs.

The performing intra handover comprises performing handover to a cell whose load status is not heavy.

The scanning characterized by scanning cells of a recommended cells list made based on the load status information of neighbor cells and the mobile station's location (LBS).

In other aspect of the present invention, a method for inter handover with consideration of load status of cells by a mobile station in a wireless communication system comprises: receiving load status information of a cell of a serving base station through a down link channel descriptor (DCD) message, and receiving load status information of neighbor cells through a neighbor advertisement (MOB-NBR-ADV) message from a serving base station, scanning neighbor cells in an inter network if load status of all intra cells is heavy, performing pre-registration according to a result of the scanning, and performing inter handover according to channel quality and load status of neighbor cells which the mobile station performed pre-registration to if the serving base station's channel quality is less than a scanning threshold.

The load status information of neighbor cells is a combination of load status information generated by a serving access service network gateway (Serving ASN-GW) and load status information generated by neighbor Serving ASN-GWs.

The performing inter handover comprises performing handover to a cell whose load status is not heavy.

Advantageous Effects

The present invention supports a mobility of a mobile station using load status information of cells, such that the mobile station to perform handover to a cell whose load status is proper and be serviced with high quality.

BRIEF DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

In the drawings.

MODE FOR THE INVENTION

Reference will now be made in detail to the exemplary embodiments of the present invention, examples of which are illustrated in the accompanying drawings. The exemplary embodiments of the invention may be modified in various forms and the invention should not be limited to the specific embodiments described herein.

According to exemplary embodiments of the present invention, a base station receives load status information of neighbor cells from an Access Service Network Gateway (ASN-GW) in a network entry process. For this, a load status information field can be inserted in a downlink channel descriptor (DCD) message, a neighbor advertisement (MOB-NBR-ADV) message, which are transmitted from a base station to a mobile station, and messages transmitted from an ASN-GW to a base station. The load status information is derived from the number of mobile stations which have prepared to communicate with a base station, and presents whether a base station can serve additional mobile stations or not.

Also, according to exemplary embodiments of the present invention, a mobile station receives load status information of neighbor cells from a base station through a DCD message or a MOB-NBR-ADV message. Using the load status information of neighbor cells, a mobile station can perform handover to a cell whose load is light when it is in a cell whose load is heavy.

According to exemplary embodiments of the present invention, when channel quality of a serving base station is low and a load of a serving base station is heavy, a mobile station reselects another cell or performs handover to another cell.

And, exemplary embodiments of the present invention provide an intra handover scenario and an inter handover scenario.

Figure 1:
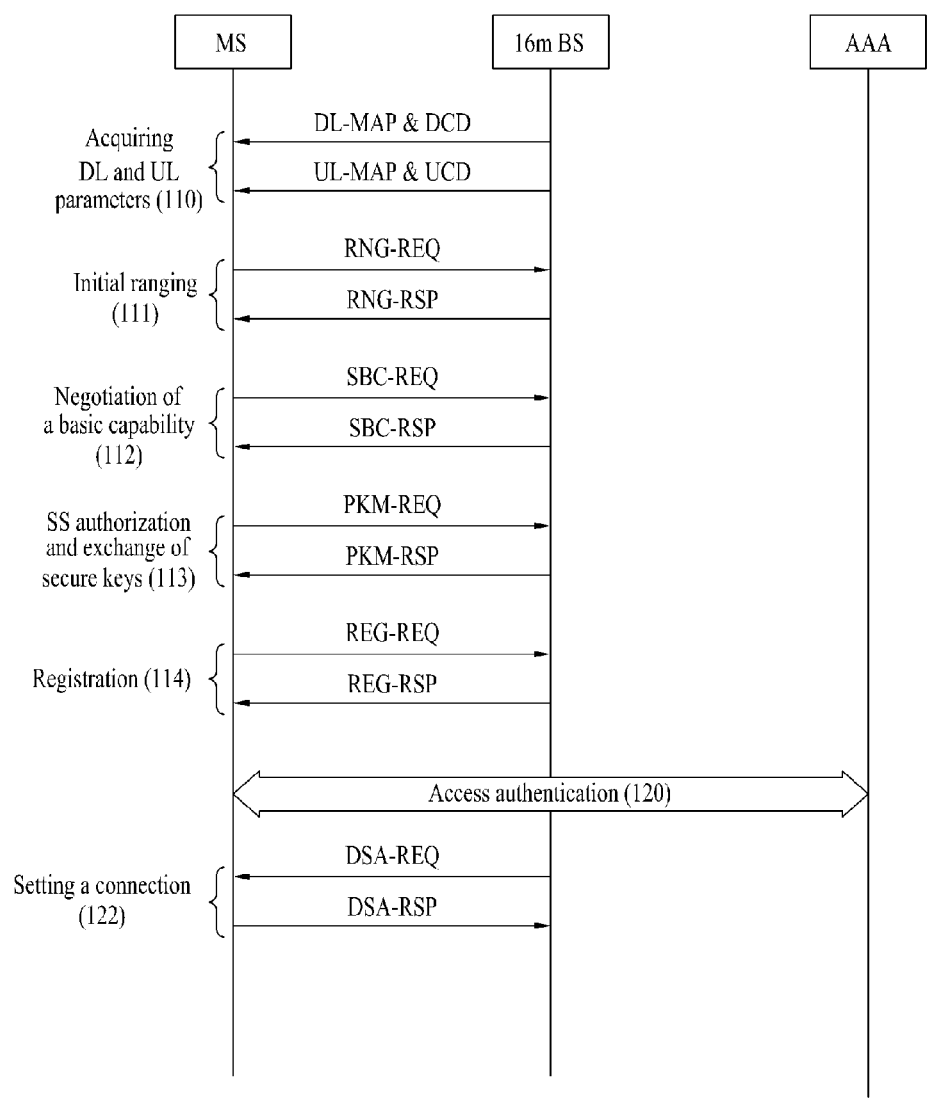
FIG. 1 illustrates an exemplarily of network entry process of a mobile station in an IEEE 802.16e network.
Figure 2:
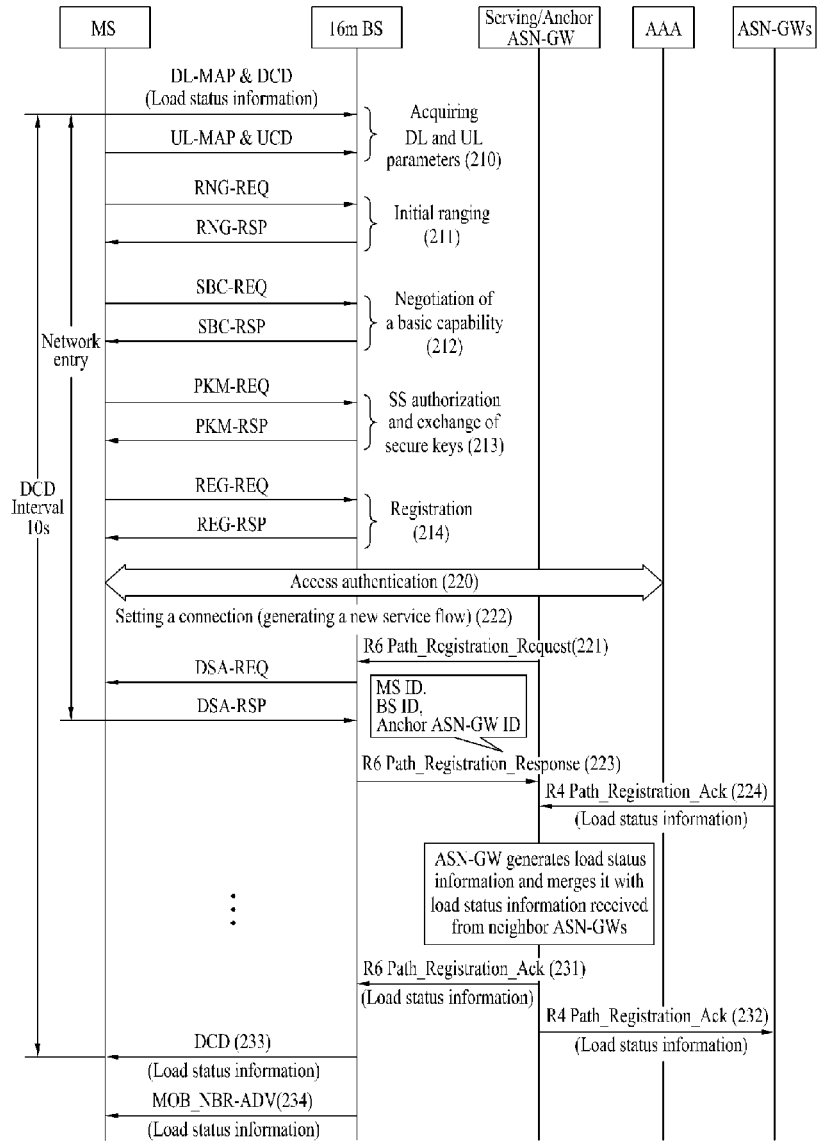
FIG. 2 illustrates a network entry process according to an exemplary embodiment of the present invention.

FIG. 2 illustrates a network entry process according to an exemplary embodiment of the present invention.

In an exemplary embodiment of the present invention, after a base station transmits a Dynamic Service Addition Request (DSA-REQ) message to a mobile station and receives a Dynamic Service Addition Response (DSA-REQ) message from a mobile station, the base station receives load status information of neighbor cells from a serving ASN-GW or an anchor ASN-GW and transmits load status information of cells through a DCD message and a MOB_NBR-ADV message to the mobile station.

In FIG. 2, the mobile station receives downlink map (DL-MAP), downlink channel descriptor (DCD), uplink map (UL-MAP) and uplink channel descriptor (UCD) messages and acquires uplink and downlink parameters (210). The mobile station checks a load status field of a DCD message. And, if load of cell of the base station is not heavy, the mobile station performs network entry, otherwise it searches a new cell which it performs network entry to.

Next, the mobile station performs initial ranging and adjusts a timing offset and a power-related parameter value (211).

And, the mobile station negotiates basic capabilities with a base station (212). At step 112, the mobile station transmits the mobile station's capabilities to the base station and receives a response.

The mobile station exchanges secure keys during authorization process (213), and performs registration process with the base station (214). And it performs authentication process with a AAA (Authentication, Authorization, Accounting) server (220).

After authentication process between the AAA server and the mobile station is completed, the serving ASN-GW transmits a Path Registration Request (Path_Registration_Request) message to the base station so that a new service flow between the mobile station and the base station can be generated (221).

The base station transmits a DSA-REQ message to the mobile station to set a service flow, and the mobile station transmits a DSA-RSP message to the base station (222).

Next, the base station transmits a R6 path registration response (R6 Path_Registration_RSP) message including a mobile station identification (MS ID), a base station identification (BS ID), ASN-GW ID, service flow information and so on to the serving ASN-GW (223).

In the meantime, the serving ASN-GW checks the MS ID, the BS ID and the ASN-GW ID of the R6 Path_Registration_RSP message, and finds out the number of mobile stations which established a connection with base stations managed by the serving ASN-GW so to judge load status of each cell. Here, the mobile stations have completed a preparing process for communication with the base stations, and the ASN-GW generates load status information of each cell based on the number of the base stations.

The serving ASN-GW receives R4 path registration acknowledgement (R4 Path_Registration_Ack) messages including load status information of each cell managed by neighbor ASN-GWs from the neighbor ASN-GWs (224). R6 is an interface for communication between a ASN-GW and a base station and R4 is an interface for communication of ASN-GWs.

The serving ASN-GW aggregates the load status information generated by the serving ASN-GW and load status information received from the neighbor ASN-GWs. And it transmits the aggregated load status information through a R6 path registration acknowledgement (R6 Path_Registration_Ack) message to the base station (231). Then, it transmits the load status information generated by the serving ASN-GW through a R4 Path_Registration_Ack messages to the neighbor ASN-GWs (232).

That is, the serving ASN-GW aggregates the load status information of the R4 Path_Registration_Ack message received from the neighbor ASN-GWs and the load status information generated based on the R6 Path_Registration_RSP message received from base stations which is managed by the serving ASN-GW. And it transmits the aggregated load status information through the R6 Path_Registration_Ack message to the base station.

Next, the base station transmits the load status information received from the serving ASN-GW to the mobile station (233, 234). The base station transmits a DCD message including load status information of the base station and a MOB_NBR-ADV message including load status information of neighbor cells to the mobile station.

In FIG. 2, a path registration process is initiated by an ASN-GW transmitting a R6 Path_Registration_Request message. However, a path registration process can be initiated by a base station. That is, a base station can initiate a path registration process transmitting a path registration request message. In this case, a message including load status information can change. As load status information is included in a R6 Path_Registration_Ack message in a path registration process initiated by an ASN-GW, it is included in a R6 Path_Registration_Response message in a path registration process initiated by a base station.

A serving ASN-GW updated load status information in a path deregistration process. In other words, a serving ASN-GW generates and updates load status information in a connection establishment process and a path deregistration process.

An update process of a serving ASN-GW according to a network entry process of a mobile station will be explained referring FIG. 3.

Figure 3:
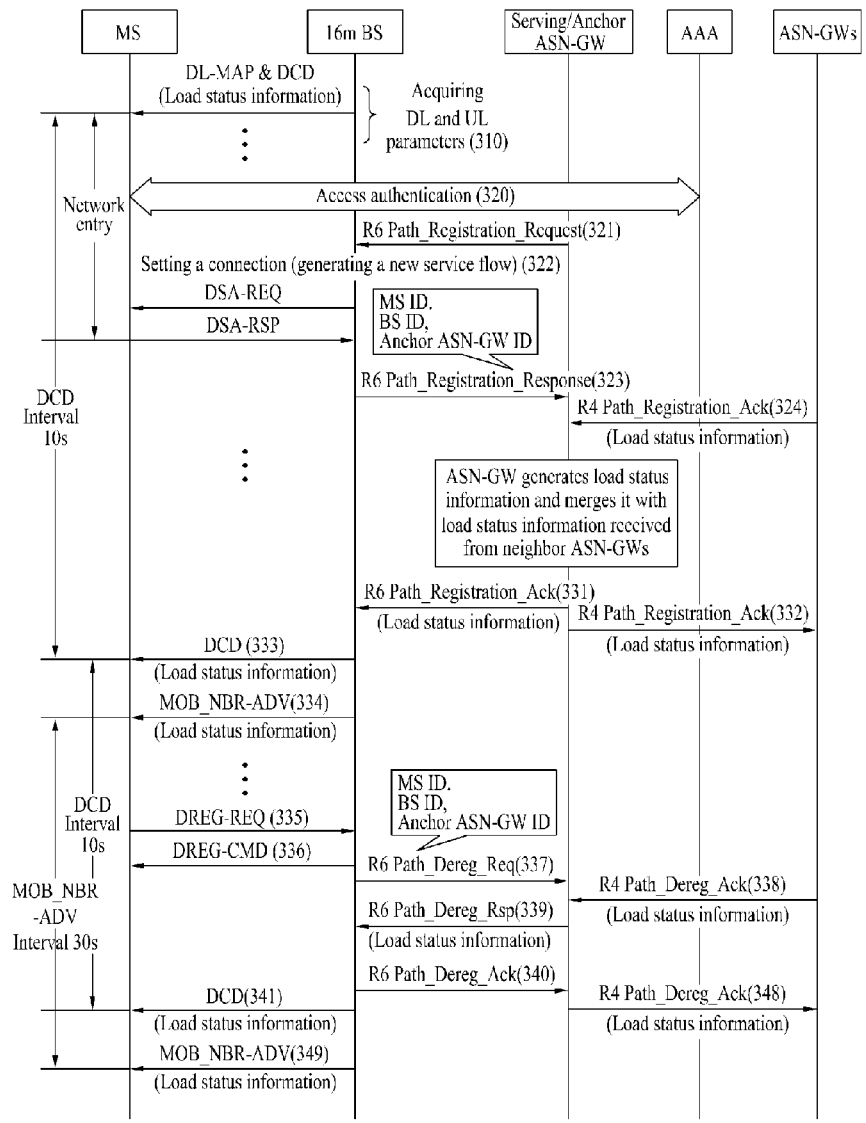
FIG. 3 illustrates a connection deregistration process according to an exemplary embodiment of the present invention.

FIG. 3 illustrates a connection deregistration process according to an exemplary embodiment of the present invention.

A mobile station receives DL-MAP, a DCD message, UL-MAP and a UCD message, and acquires uplink and downlink parameters (310). Then, the mobile station checks a load status field of a DCD message. And, if load of cell of the base station is not heavy, the mobile station performs network entry; otherwise it searches a new cell which it performs network entry to.

After a registration process, the mobile station performs an authentication process with an AAA server (320).

After the authentication process, a serving ASN-GW transmits a R6 Path_Registration_Request message to the base station to set a new service flow between the mobile station and the base station (321).

The base station transmits a DSA-REQ message to the mobile station to set a service flow, and the mobile station transmits a DSA-RSP message to the base station (322).

Next, the base station transmits a R6 Path_Registration_RSP message including a MS ID), a BS ID, an ASN-GW ID, service flow information and so on to the serving ASN-GW (323).

The serving ASN-GW checks the MS ID, the BS ID and the ASN-GW ID of the R6 Path_Registration_RSP message, and finds out the number of mobile stations which established a connection with base stations managed by the serving ASN-GW so to judge load status of each cell. And the serving ASN-GW generates load status information of each cell managed by the serving ASN-GW.

The serving ASN-GW receives R4 Path_Registration_Ack messages including load status information of each cell managed by neighbor ASN-GWs from the neighbor ASN-GWs (324).

The serving ASN-GW aggregates the load status information generated by the serving ASN-GW and load status information received from the neighbor ASN-GWs. And it transmits the aggregated load status information through a R6 Path_Registration_Ack message to the base stations managed by the serving ASN-GW (331). Then, it transmits the load status information generated by the serving ASN-GW through a R4 Path_Registration_Ack messages to the neighbor ASN-GWs (332). And the base station transmits the load status information received from the serving ASN-GW to the mobile station (333, 334).

Next, the mobile station transmits a deregistration request (DREG-REQ) message to the base station to inform that it will terminate a connection (335), and receives a deregistration commend (DREG-CMD) message from the base station (336). Then, it performs a next process according to action codes of the DREG-CMD message.

Next, the base station transmits a R6 path deregistration request (R6 Path_Dereg_Req) message to the serving ASN-GW (337). Then, the serving ASN-GW performs a process to release the mobile station's context and data path resource.

The serving ASN-GW checks a MSID, a BSID and an ASN-GW ID included in the R6 Path_Dereg_Req message, and generates and updates load status information.

The serving ASN-GW receives load status information through a R4 Path_Dereg_Ack message from neighbor ASN-GWs (338), and aggregates the updated load status information and the received load status information. Then it sends the aggregated load status information through a R6 Path_Dereg_Rsp message to the base station (339).

The base station, which received the R6 Path_Dereg_Rsp message, transmits a R6 Path_Dereg_Ack message as a response to the serving ASN-GW (340).

The serving ASN-GW transmits the updated load status information through a R4 Path_Registration_Ack messages to the neighbor ASN-GWs (348).

The base station transmits the load status information received from the serving ASN-GW through a DVD message and a MOB_NBR-ADV message to the mobile station (341, 349).

In FIG. 3, a path deregistration process is initiated by a base station. However, a path deregistration process can be initiated by an ASN-GW. In this case, a message including load status information can change. As load status information is included in a R6 Path_Registration_Rsp message in a path registration process initiated by a base station, it is included in a R6 Path_Registration_Ack message in a path registration process initiated by an ASN-GW.

A reason that a serving ASN-GW generates load status information after transmission of a DSA-REQ message and a DSA-RSP message between a base station and a mobile station is as follows. A mobile station sets a service flow and a connection with a base station after transmission of a DSA-REQ message and a DSA-RSP message. So, because a mobile station completes a preparation process after transmission of a DSA-REQ message and a DSA-RSP message, mobile stations, which transmitted a DSA-REQ message and received a DSA-RSP message, are considered to generate load status information.

A point of time that neighbor ASN-GWs generate load status information is same as above. That is, the neighbor ASN-GWs generates load status information based in a Path_Registration_Response message after receiving the Path_Registration_Response message from a base station, which received a DSA-RSP message from a mobile station.

Figure 4:
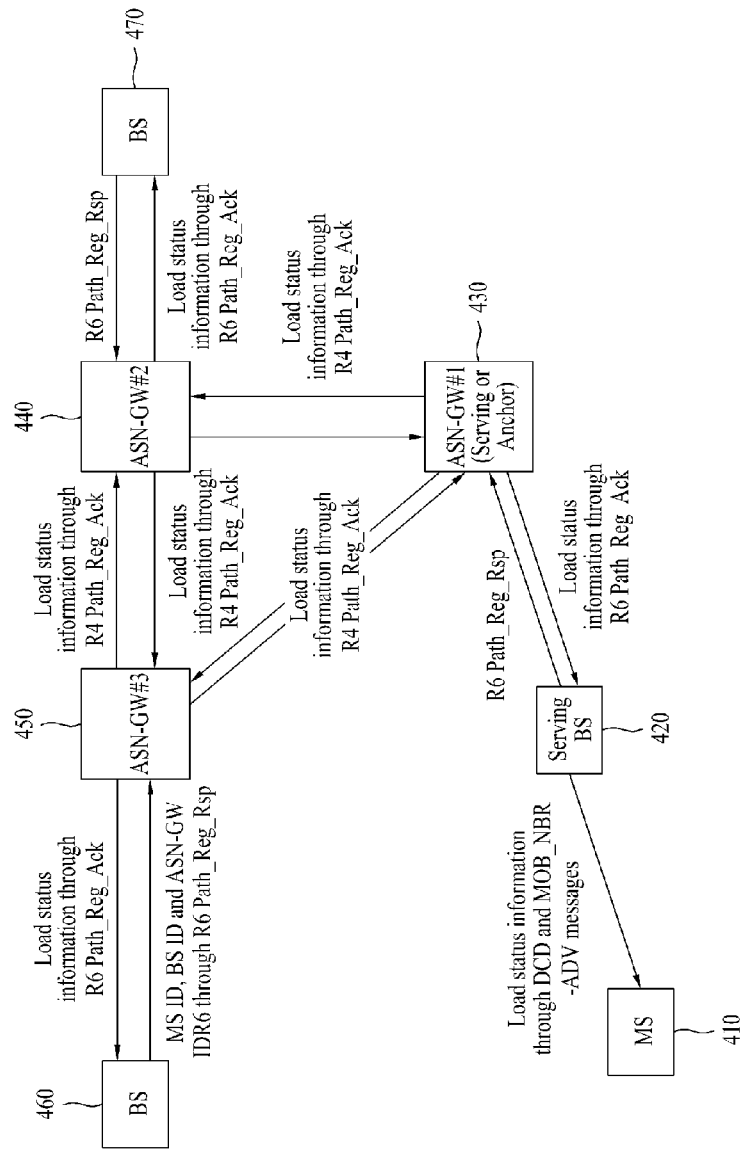
FIG. 4 illustrates an exemplarily of a process to transmit and receive load status information.

FIG. 4 illustrates an exemplarily of a process to transmit and receive load status information.

Referring to FIG. 4, a ASN-GW#3 (450) generates load status information of cells based MS IDs, BS IDs and a ASN GW ID in R6 Path_Registration_Response messages received from base stations, which are managed by the ASN-GW#3. Also, the ASN-GW#3 transmits the generated load status information through a R4 Path_Registration_Ack message to neighbor ASN-GWs (430, 440).

Each ASN-GW (430, 440, 450) transmits load status information through a R6 Path_Registration_Ack message to base stations (420, 460, 470) which are managed by each ASN-GW. Them the base stations transmits load status information through a DCD message and/or a MOB_NBR-ADV message to mobile stations.

Table 1 presents an exemplarily of a form of a R6 Path_Registration_Ack message.

TABLE 1

| IE | M/O | Notes |
| --- | --- | --- |
| MS Info | | Contains HO-related MS context in the nested IEs. |
| >MSID | O | 6 octet MSID (MAC Address). |
| >Data Path Info | O | Data Path Info for per-MS or per-BS granularity tunnel. |
| >SF Info(one or more) | | Each IE of the list contains context of a particular SF. |
| >>SFID | O | SFID associated with the Service Flow |
| >>Result Code | O | Indication whether this SF can be supported. |
| >>>Data Path Info | O | Data Path Info for per-flow granularity tunnel. |
| BS's Load Status Info | O | Indication of load status of each base station, which is managed by each ASN-GW, for each ASN-GW. |
| >ASN-GW ID | | |
| >>BSID | | |
| >>> Load Status | | It means that If the field was set to 1, traffic condition is heavy, otherwise traffic condition is nice. |

A Path_Registration_Ack message is a response a Path_Registration_Response message. In exemplary embodiments of the present invention, load status information of cells is inserted in a legacy Path_Registration_Ack message.

A mobile station is informed of load status information with a DCD message and/or a MOB_NBR-ADV message. If load status of a cell of a mobile station is heavy that is, '0x01' of a load status field is set to '1', a mobile station can perform handover to a cell that can provide a good service and has a light load.

Table 2 presents an exemplarily of a form of a R4 Path_Registration_Ack message.

TABLE 2

| IE | M/O | Notes |
| --- | --- | --- |
| MS Info | M | |
| >SF Info | | |
| >>SFID | M | SFID as defined on R1. |
| Load Status Info | O | Indication of load status of each base station, which is managed by each ASN-GW, for each ASN-GW. |
| >ASN-GW ID | | |
| >>BSID | | |
| >>> Load Status | | It means that If the field was set to 1, traffic condition is heavy, otherwise traffic condition is nice. |

Table 3 presents an exemplarily of a form of a R6 Path_Registration_Response message.

TABLE 3

| IE | M/O | Notes |
| --- | --- | --- |
| Registration Type | M | Describes type of the Registration (HO, Initial Entry, etc.) |
| MS Info | | |
| >MSID | O | 6 octet MSID (MAC Address) |
| >Anchor ASN GW ID | O | Identifies the Anchor ASN GW |
| >Data Path Info | O | Data Path Info per-flow granularity tunnel |
| >SF Info | | Each IE of the list contains context of a particular SF |
| >>SFID | M | SFID associated with the Service Flow |
| >>Data Path Info | | Data Path Info per-flow granularity tunnel |
| BS Info | M | |
| >BSID | M | BSID |
| Load Status Info | O | Indication Load Status of the base station |
| >>> Load Status | | It means that If the field was set to 1, traffic condition is heavy, otherwise traffic condition is nice. |

A R6 Path_Registration_Response message is a response for a R6 Path_Registration_Request message. In exemplary embodiments of the present invention, load status information of cells is inserted in a legacy Path_Registration_Response message.

Table 4 presents an exemplarily of a form of a R6 Path_Dereg_Rsp message.

TABLE 4

| IE | M/O | Notes |
| --- | --- | --- |
| Registration Type | M | |
| MS Info | O | |
| >SF Info | | |
| >>SFID | M | |
| BS Info | O | |
| Load Status Info | O | Indication of load status of each base station, which is managed by each ASN-GW, for each ASN-GW. |
| >ASN-GW ID | | |
| >>BSID | | |
| >>> Load Status | | It means that If the field was set to 1, traffic condition is heavy, otherwise traffic condition is nice. |

A R6 Path_Dereg_Rsp message is a response for a R6 Path_Dereg_Req message. In exemplary embodiments of the present invention, load status information of cells is inserted in a legacy Path_Dereg_Rsp message.

Table 5 presents an exemplarily of a form of a R4/R6 Path_Dereg_Ack message.

TABLE 5

| IE | M/O | Notes |
| --- | --- | --- |
| Registration Type | M | |
| MS Info | O | |
| >SF Info | | |
| >>SFID | M | |
| Load Status Info | O | Indication of load status of each base station, which is managed by each ASN-GW, for each ASN-GW. |
| >ASN-GW ID | | |
| >>BSID | | |
| >>> Load Status | | It means that If the field was set to 1, traffic condition is heavy, otherwise traffic condition is nice. |

A R6 Path_Dereg_Ack message is a response for a R6 Path_Dereg_Rsp message and transmitted from an ASN-GW to a base station. A R4 Path_Dereg_Ack message is transmitted between ASN-GWs, and load status information are exchanged through it. In exemplary embodiments of the present invention, load status information of cells is inserted in a R6/R4 legacy Path_Dereg_Ack message.

After checking load status information of a R6 Path_Registration_Ack received from a serving ASN-GW, a base station transmits a DCD message including load status information of the base station. Because a load status information field of a DCD message presents whether load status is heavy or not so not to change frequently, the problem that a mobile station must check a DCD message very often is solved. A base station increase a DCD count value of DL MAP so to inform a mobile station that a DCD message has been updated. Thus, a mobile station checks a DCD message only when a DCD count value of a DL MAP changes.

Table 6 presents an exemplarily of a load status field inserted in a DCD message.

TABLE 6

| Name | Type | Length | Value | PHY scope |
| --- | --- | --- | --- | --- |
| Load Status | xx | 1 bit | It means that If the field was set to 1, traffic condition is heavy, otherwise traffic condition is nice. | OFDMA |

In exemplary embodiments of the present invention, a base station inserts its load status information in a DCD message so that a mobile station can know its load status. A mobile station checks a parameter related to load status information in a DCD message only when a DCD count value of a DL MAP changes.

In exemplary embodiments of the present invention, a mobile station can perform network entry effectively using load status information of cells. As illustrated in FIG. 2, a mobile station checks a DCD message received from a base station in a first step of a network entry process. A mobile station continues a network entry process if a load status information field of a DCD message is not '1', otherwise a mobile station searches another cell.

Table 7 presents an exemplarily of a MOB_NBR-ADV message including a load status field.

TABLE 7

| Syntax | Size (bit) | Notes |
| --- | --- | --- |
| MOB_NBR-ADV_Message_format( ) { | — | — |
| ~ | | |
| TLV Encoded Neighbor Information { //TLV Encoded Neighbor Information starts | variable | TLV-specific |
| > DCD_settings | | |
| >> Load Status | 1 | It means that If the field was set to 1, traffic condition is heavy, otherwise traffic condition is nice. |
| ~ | | |
| } //TLV Encoded Neighbor Information finishes | | |
| ~ | | |
| } //End of MOB_NBR-ADV | | |

A MOB_NBR-ADV message is a broadcast message transmitted from a base station to mobile stations and includes information of neighbor cells. In table 7, load status information is inserted in "DCD_settings" of "TLV Encoded Neighbor Information" in a MOB_NBR-ADV message.

Table 8 presents an exemplarily of a handover request (MOB_MSHO-REQ) message. A mobile station transmits a MOB_MSHO-REQ message to perform handover to a serving base station.

TABLE 8

| Syntax | Size (bit) | Notes |
|---|---|---|
| MOB_MSHO-REQ_format( ) { | — | — |
| ~ | | |
| HO Type | | It means that If the field was set to 1, HO type is Inter RAT HO, otherwise HO type is Intra HO. |
| ~ | | |
| } //End of MOB_MSHO-REQ | | |

In exemplary embodiments of the present invention, a handover type (HO Type) field is inserted in a MOB_MSHO-REQ message to support inter handover (Inter RAT HO). A mobile station fills contents of a MOB_MSHO-REQ message based on a HO Type field. For example, contents for each inter RAT network are filled in a MOB_MSHO-REQ message if a HO Type is '1', and information of neighbor cells in an intra network is filled in a MOB_MSHO-REQ message if a HO Type is '0'. Also, a HO Type field is inserted in a handover response (MOB_BSHO-RSP) message and a handover indication (MOB_MSHO-IND) message.

A mobile station can perform reliable handover referring load status information. Also a base station can instruct a mobile station to perform referring load status information and quality of service (QoS) information.

Figure 5:
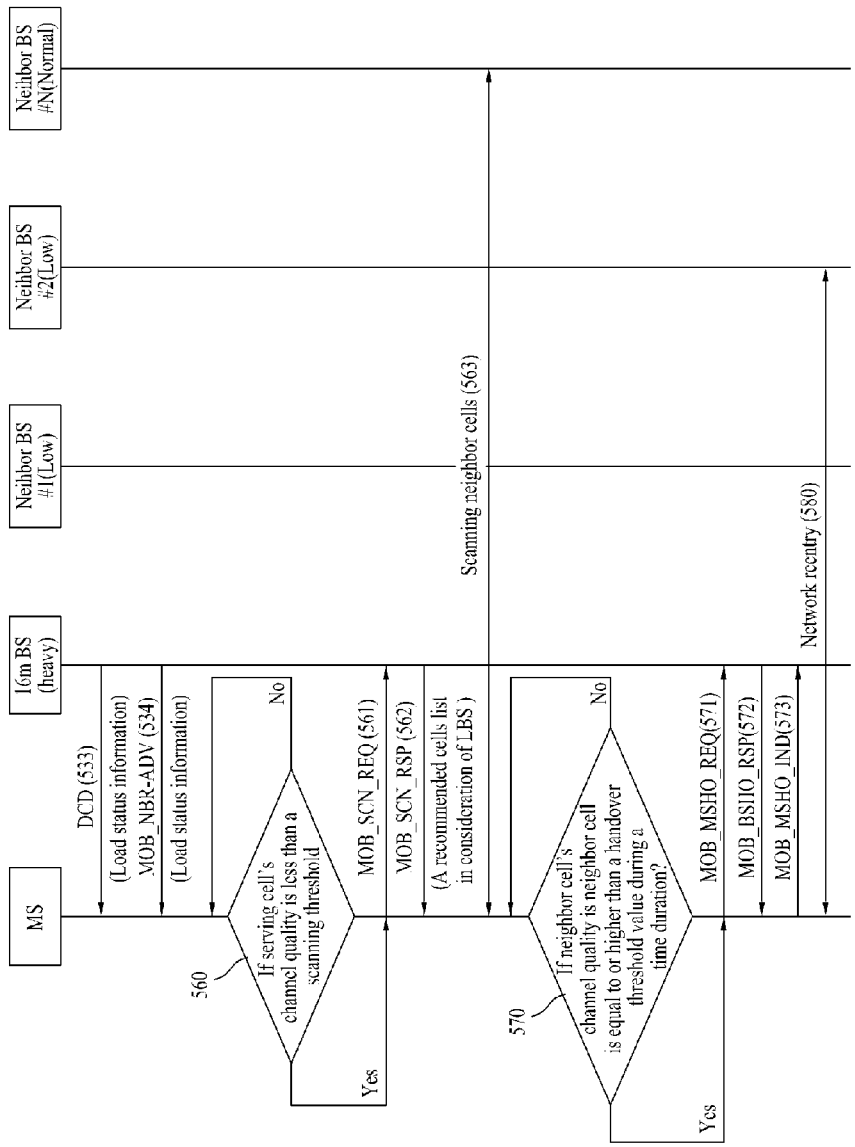
FIG. 5 illustrates a handover method with consideration of load status of cells according to an exemplary embodiment of the present invention.

FIG. 5 illustrates a handover method with consideration of load status of cells according to an exemplary embodiment of the present invention. In FIG. 5, intra handover is illustrated.

A mobile station receives a DCD message from a base station and acquires load status information of a serving cell (533). Also, it receives a MOB_NBR-ADV message and acquires load status information of intra neighbor cells (534).

If channel quality of the serving cell falls below a scanning threshold, the mobile station decides to scan neighbor cells (560).

The mobile station transmits a scanning request (MOB_SCN-REQ) message to a serving base station to scan intra neighbor cells (561). And it receives a recommended cells list made based on the load status information of neighbor cells and the mobile station's location through a scanning response (MOB_SCN-RSP) message from a mobile station (562). The recommended cells are proper cells for handover of the mobile station.

The mobile station scans intra neighbor cells referring the recommended list of the MOB_SCN-RSP message (563).

Scanning intra neighbor cells continuously, the mobile station finds out at least a neighbor cell of which channel quality is equal to or higher than a handover threshold during a time duration, and decides to perform intra handover to a cell whose channel quality is best among the at least a neighbor (570).

The mobile station transmits a MOB_MSHO-REQ message to the serving base station to initiate a handover process (571). At this time, the mobile station makes a candidate cells list for handover referring the load status information of cells, and includes it in the MOB_MSHO-REQ message.

Then, the serving base station transmits a handover response (MOB_BSHO-RSP) message to the mobile station (572). The serving base station checks the candidate cells list for handover in the list MOB_MSHO-REQ message. And it updates the candidate cells list for handover based on information which the serving base station has, and transmits the updated candidate cells list for handover through the MOB_BSHO-RSP message.

The mobile station checks the candidate cells list for handover in the MOB_BSHO-RSP message. Then, it decides a target cell based on channel quality information and the load status information of cells, and transmits a handover indication (MOB_MSHO-IND) message including information of the decided target cell to the serving base station (573).

After completing handover to the target cell (Neighbor BS #2), the mobile station performs network reentry (580).

Additionally, when the serving base station checks load status information of the serving cell and neighbor cells and judges that handover is necessary, it can instruct the mobile station to perform handover setting a handover operation mode field as '1 (mandatory handover request)'. In this time the serving base station can instructs the mobile station to return to the serving base station only if a handover trigger condition is satisfied after completing handover. For example, if the mobile station requests bandwidth to the serving base station when load status of the base station is heavy, the serving base station can instruct the mobile station to perform handover to a neighbor cell whose load status is not heavy.

Exemplary embodiments of the present invention provide two scenarios of an inter RAT handover process.

Figure 6:
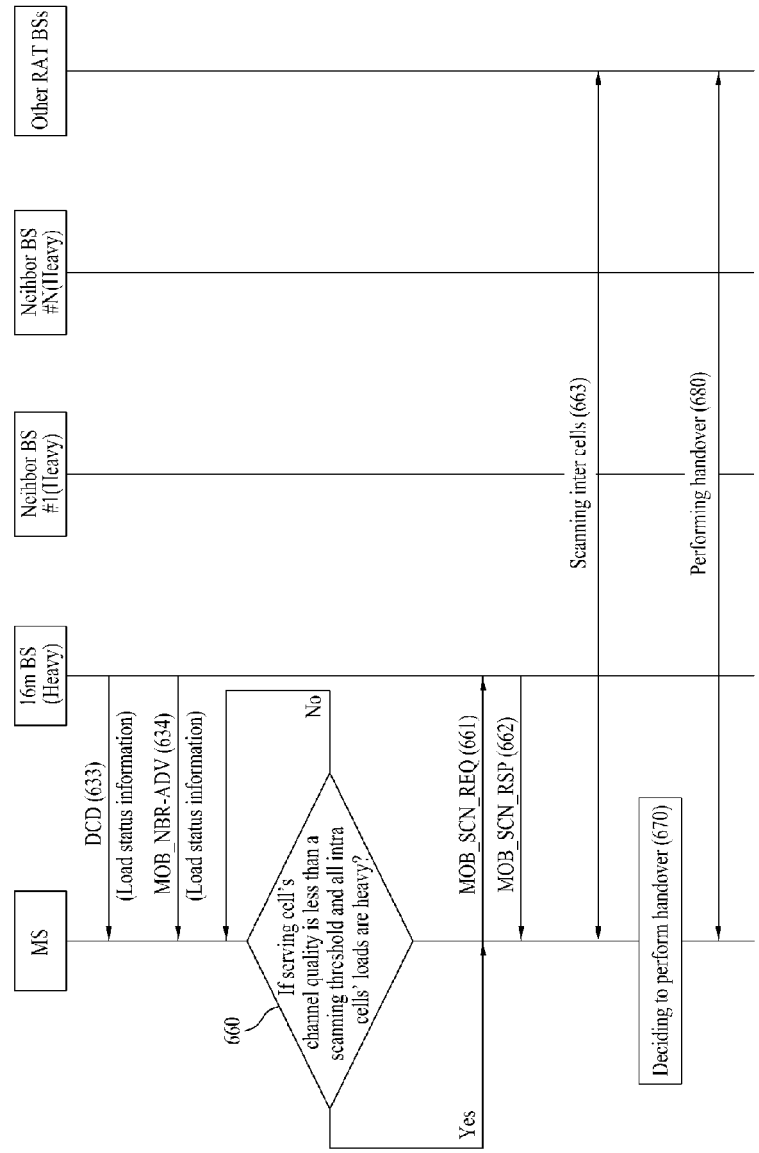
FIG. 6 illustrates a inter RAT handover method with consideration of load status of cells according to an exemplary embodiment of the present invention.

FIG. 6 illustrates a inter RAT handover method with consideration of load status of cells according to an exemplary embodiment of the present invention. In FIG. 6, inter RAT handover without pre-registration is illustrated.

A mobile station receives a DCD message including load status of a serving cell (633). And the mobile station receives a MOB_NBR-ADV message including load status of neighbor cells (634).

Then, if channel quality of the serving cell falls below an inter RAT scanning threshold and load status of all intra cells is heavy, the mobile station decides to scan neighbor cells in an inter network (660).

To scan neighbor cells in an inter network, the mobile station checks information of neighbor cells in an inter network of the MOB_NBR-ADV message. Based on result of the checking, the mobile station makes a recommended cells list for scanning and sends it to the serving base station through a scanning request (MOB_SCN-REQ) message (661).

The serving base station makes a recommended cells list for scanning and sends it to the mobile station through a scanning response (MOB_SCN-RSP) message (662).

After checking a recommended cells list for scanning of the MOB_SCN-RSP message, the mobile station scans neighbor cells in an inter network (663).

The mobile station decides to perform handover to a cell in the intra network based on result of the scanning (670). For example, the mobile station can scan the neighbor cells in the inter network so that find out cells whose channel quality is higher than an inter handover threshold (Inter RAT HO threshold) during a time duration, and decide to perform handover to a cell whose channel quality is best among them.

Finally, the mobile station performs handover to a cell decided in an above-mentioned process (680).

Figure 7:
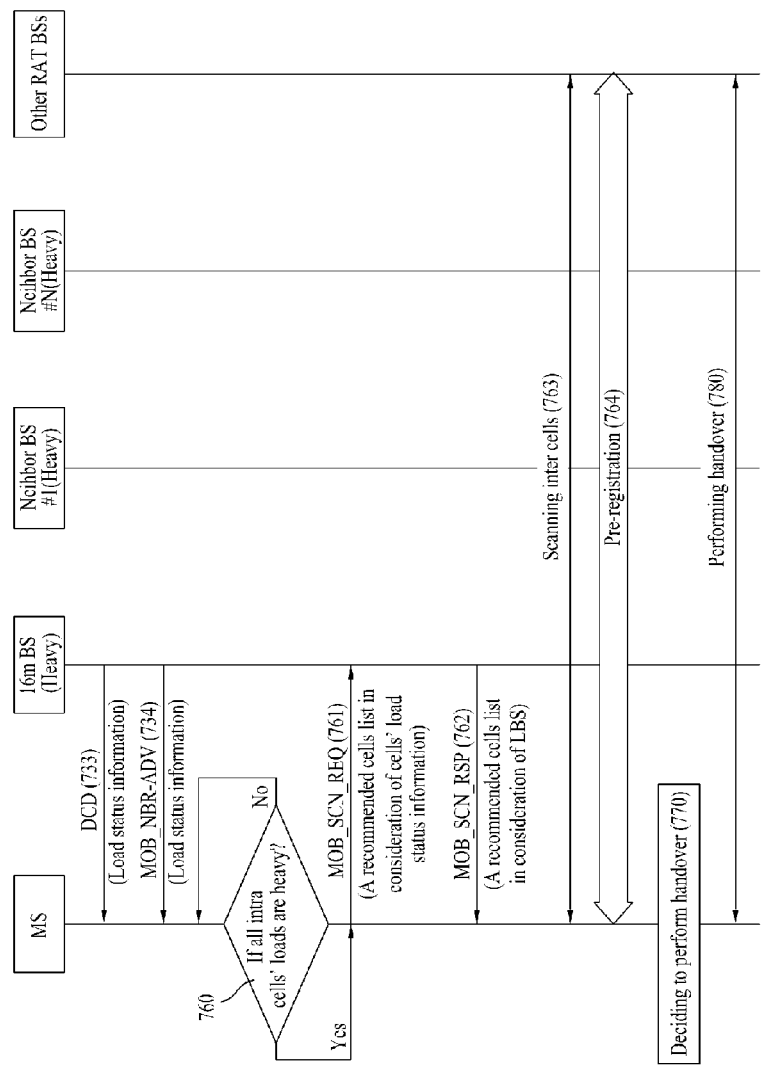
FIG. 7 illustrates a inter RAT handover method with consideration of load status of cells according to another exemplary embodiment of the present invention.

FIG. 7 illustrates a inter RAT handover method with consideration of load status of cells according to another exemplary embodiment of the present invention. In FIG. 7, inter RAT handover with pre-registration is illustrated.

A mobile station receives a DCD message including load status of a serving cell (733). And the mobile station receives a MOB_NBR-ADV message including load status of neighbor cells (734).

Then, load status of the serving cell and all intra cells is heavy, the mobile station decides to scan neighbor cells in an inter network (760). It can be added to conditions for scanning that channel quality of the serving cell falls below an inter RAT scanning threshold.

To scan neighbor cells in an inter network, the mobile station checks information of neighbor cells in an inter network of the MOB_NBR-ADV message. Based on result of the checking, the mobile station makes a recommended cells list for scanning and sends it to the serving base station through a scanning request (MOB_SCN-REQ) message (761).

The serving base station makes a recommended cells list for scanning and sends it to the mobile station through a scanning response (MOB_SCN-RSP) message (762).

After checking a recommended cells list for scanning of the MOB_SCN-RSP, the mobile station scans neighbor cells in an inter network (763). The mobile station performs pre-registration to a inter cell whose channel quality is best based on result of the scanning (764).

After pre-registration, the mobile station continues to scan channel quality of the serving cell. And if channel quality of the serving cell falls below an inter RAT scanning threshold, the mobile station scans the pre-registered inter cell. Then, the mobile station decide to perform handover to the pre-registered inter cell when channel quality of the pre-registered inter cell is equal to or higher than the inter RAT handover threshold during a time duration (770).

Finally, the mobile station performs handover to the inter cell (780).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention relates to handover, and more particularly, to a method for handover that makes a mobile station to be provided with best quality of service. The present invention is applicable base stations and mobile stations of an IEEE 802.16m system, and so on.

The invention claimed is:

1. A method for inter handover with consideration of load status of cells by a mobile station in a wireless communication system, the method comprising:
   receiving a down link channel descriptor (DCD) message and a neighbor advertisement (MOB-NBR-ADV) message from a serving base station, the DCD message comprising a first load status field that indicates whether a load status of a cell of the serving base station is heavy, the MOB-NBR-ADV message comprising a second load status field that indicates whether a load status of an intra neighbor cell is heavy;
   scanning neighbor cells in an inter network if channel quality of the serving base station is less than a scanning threshold, the first load status field indicates the load status of the cell of the serving base station is heavy, and the second load status field indicates the load status of the intra neighbor cell is heavy; and
   performing inter handover based on load status of the neighbor cells in the inter network and a result of the scanning.

2. The method of claim 1, wherein performing inter handover comprises performing handover to a cell having a load status that is not heavy.

3. The method of claim 1, wherein scanning neighbor cells comprises scanning cells of a recommended cells list made based on the load status of the neighbor cells and a location of the mobile station (LBS).

4. A method for inter handover with consideration of load status of cells by a mobile station in a wireless communication system, the method comprising:
   receiving a down link channel descriptor (DCD) message and a neighbor advertisement (MOB-NBR-ADV) message from a serving base station, the DCD message comprising a first load status field that indicates whether a load status of a cell of the serving base station is heavy, the MOB-NBR-ADV message comprising a second load status field that indicates whether a load status of an intra neighbor cell is heavy;
   scanning neighbor cells in an inter network if the first load status field indicates the load status of the cell of the serving base station is heavy and the second load status field indicates the load status of the intra neighbor cell is heavy;
   performing pre-registration based on a result of the scanning; and
   performing inter handover based on channel quality and load status of neighbor cells to which the mobile station performed pre-registration if channel quality of the serving base station is less than a scanning threshold.

5. The method of claim 4, wherein performing inter handover comprises performing handover to a cell having a load status that is not heavy.

* * * * *